(12) United States Patent
Kobayashi

(10) Patent No.: US 9,574,681 B2
(45) Date of Patent: Feb. 21, 2017

(54) VARIABLE VALVE TIMING CONTROL APPARATUS

(71) Applicant: AISIN SEIKI KABUSHIKI KAISHA, Kariya-shi (JP)

(72) Inventor: Masaki Kobayashi, Okazaki (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 159 days.

(21) Appl. No.: 14/341,229

(22) Filed: Jul. 25, 2014

(65) Prior Publication Data

US 2015/0053158 A1  Feb. 26, 2015

(30) Foreign Application Priority Data

Aug. 26, 2013  (JP) ................ 2013-174797

(51) Int. Cl.
*F01L 1/34* (2006.01)
*F16K 31/48* (2006.01)
(Continued)

(52) U.S. Cl.
CPC .............. *F16K 31/48* (2013.01); *F01L 1/3442* (2013.01); *F01L 2001/0476* (2013.01);
(Continued)

(58) Field of Classification Search
CPC ............. F01L 2001/34423; F01L 2001/34479; F01L 2001/34486; F01L 2001/34483; F01L 2001/3445; F01L 2001/3443; F01L 2001/34433; F01L 2001/34426; F01L 2001/34446; F01L 1/3442; F01L 2001/34463; F01L 2001/34466; F01L 2820/041; Y10T 137/8667; F16K 31/48
(Continued)

(56) References Cited

U.S. PATENT DOCUMENTS 6,505,588 B2  1/2003  Dietz
6,976,460 B2  12/2005  Komazawa et al.
(Continued)

FOREIGN PATENT DOCUMENTS

DE   198 57 762 A1   6/2000
DE   101 18 119 A1   10/2002
(Continued)

OTHER PUBLICATIONS

Extended European Search Report issued on Jun. 8, 2015, by the European Patent Office in corresponding European Patent Application No. 14181597.7-1606 (6 pages).
(Continued)

*Primary Examiner* — Ching Chang
(74) *Attorney, Agent, or Firm* — Buchanan Ingersoll & Rooney PC

(57) ABSTRACT

A variable valve timing control apparatus includes a driving-side rotation member, a driven-side rotation member, an intermediate lock mechanism including first and second lock members, first and second recess portions, and a guide groove, a sensor, and a control portion. The control portion performs a control so that the relative rotation phase is changed until a first stop state is established in a state where the relative rotation phase is in an unlocked state and one of the first and second lock members is positioned relative to one of the first and second recess portions at which the guide groove is formed at a side opposite from a side where the guide groove is formed. The control portion reverses a change direction of the relative rotation phase after the first stop state is established so that the relative rotation phase is changed until a second stop state is established.

5 Claims, 6 Drawing Sheets

(51) Int. Cl.
*F01L 1/344* (2006.01)
*F01L 1/047* (2006.01)

(52) U.S. Cl.
CPC .............. *F01L 2001/3443* (2013.01); *F01L 2001/34463* (2013.01); *F01L 2001/34466* (2013.01); *F01L 2001/34473* (2013.01); *F01L 2001/34483* (2013.01); *F01L 2250/02* (2013.01); *F01L 2800/00* (2013.01); *F01L 2800/01* (2013.01); *F01L 2800/03* (2013.01); *F01L 2820/041* (2013.01)

(58) Field of Classification Search
USPC ............................................. 123/90.15, 90.17
See application file for complete search history.

(56) References Cited

U.S. PATENT DOCUMENTS

| | | | |
|---|---|---|---|
| 8,146,550 | B2 | 4/2012 | Takemura |
| 8,833,318 | B2 | 9/2014 | Strauss et al. |
| 2004/0187818 | A1 | 9/2004 | Lehmann et al. |
| 2005/0016481 | A1* | 1/2005 | Komazawa ............. F01L 1/022 123/90.17 |
| 2009/0250028 | A1 | 10/2009 | Fujiyoshi et al. |
| 2010/0139592 | A1 | 6/2010 | Takemura |
| 2011/0214634 | A1 | 9/2011 | Yamaguchi et al. |
| 2011/0277722 | A1 | 11/2011 | Bittner et al. |

FOREIGN PATENT DOCUMENTS

| | | |
|---|---|---|
| DE | 103 07 624 A1 | 9/2004 |
| DE | 10 2009 034 512 A1 | 1/2011 |
| JP | 4-91308 A | 3/1992 |
| JP | 9-264110 A | 10/1997 |
| JP | 9-317412 A | 12/1997 |
| JP | 11-132016 A | 5/1999 |
| JP | 11-210425 A | 8/1999 |
| JP | 11-218010 A | 8/1999 |
| JP | 11-280430 A | 10/1999 |
| JP | 2004-257313 A | 9/2004 |
| JP | 2009-250073 A | 10/2009 |
| JP | 2010-138699 A | 6/2010 |
| JP | 2011-256772 A | 12/2011 |

OTHER PUBLICATIONS

Search Report dated Sep. 2, 2016 issued by the German Patent and Trademark Office in corresponding German Patent Application No. 20 2014 010 674,6, and English language translation of Office Action (9 pages).

* cited by examiner

VARIABLE VALVE TIMING CONTROL APPARATUS

CROSS REFERENCE TO RELATED APPLICATIONS

This application is based on and claims priority under 35 U.S.C. §119 to Japanese Patent Application 2013-174797, filed on Aug. 26, 2013, the entire content of which is incorporated herein by reference.

TECHNICAL FIELD

This disclosure generally relates to a variable valve timing control apparatus.

BACKGROUND DISCUSSION

A known variable valve timing control apparatus controlling a relative rotation phase of a driven-side rotation member relative to a driving-side rotation member that rotates in synchronization with a crankshaft of an internal combustion engine may change an opening and closing timing of an intake valve and an exhaust valve depending on an operation condition of the internal combustion engine. Such variable valve timing control apparatus includes a mechanism for changing the opening and closing timing of the intake valve and the exhaust valve that open and close in association with the rotation of the driven-side rotation member by changing a relative rotation phase of the driven-side rotation member relative to the driving-side rotation member that rotates by an operation of the engine.

Generally, an optimum opening and closing timing of the intake valve and the exhaust valve depends on an engine operation condition at an engine start and driving of a vehicle, for example. Thus, at the engine start, the relative rotation phase of the driven-side rotation member relative to the driving-side rotation member is locked at a predetermined phase between a most retarded angle phase and a most advanced angle phase. As a result, the optimum opening and closing timing of the intake valve and the exhaust valve for the engine start is achieved and a generation of hitting sound by rotation or movement of a partition portion provided at a hydraulic chamber that is formed by the driving-side rotation member and the driven-side rotation member is restrained. It is thus desirable to lock the relative rotation phase at the aforementioned predetermined phase before the engine is stopped.

JP2004-257313A, which will be hereinafter referred to as Reference 1, discloses a variable valve timing control apparatus that includes two lock members (moving members) and two recess portions (grooves) fitted to the respective lock members so that the relative rotation phase is locked at an intermediate lock phase between the most advanced angle phase and the most retarded angle phase. In the variable valve timing control apparatus disclosed in Reference 1, one of the lock members, i.e., an advanced angle lock portion, restricts the relative rotation phase from changing to a retarded angle direction while the other of the lock members, i.e., a retarded angle lock portion, restricts the relative rotation phase from changing to an advanced angle direction. Each of the recess portions is formed with a ratchet, i.e., a stepped portion. In a case where the relative rotation phase changes from the most retarded angle phase to the intermediate lock phase, the two lock members are alternately fitted to the corresponding ratchets and then alternately fitted to the corresponding recess portions so as to restrict the relative rotation phase from changing in an opposite direction. The relative rotation phase may be securely locked at the intermediate lock phase accordingly.

JP2009-250073A, which will be hereinafter referred to as Reference 2, discloses a variable valve timing control apparatus (a valve timing adjusting apparatus) including one lock member (a lock pin) and one restriction member (a restriction pin). The lock member is configured to be fitted to a lock recess portion (a lock bore) while the restriction member is configured to be fitted to a restriction recess portion (restriction groove). In the variable valve timing control apparatus disclosed in Reference 2, the lock member is fitted to the lock recess portion to lock the relative rotation phase at the intermediate lock phase between the most advanced angle phase and the most retarded angle phase to simultaneously restrict the relative rotation phase from changing to the advanced angle direction and the retarded angle direction. A ratchet (a limiting groove) is formed at the lock recess portion. Each of the lock member and the restriction member includes a body portion and a projection portion that are formed by an outer peripheral surface in a stepped cylindrical form, the diameter of the outer peripheral surface decreasing in a stepped manner in a fitting direction of the lock member and the restriction member relative to the lock recess portion and the restriction recess portion. In the aforementioned configuration, in a case where the relative rotation phase changes from the most retarded angle phase to the intermediate lock phase, the projection portion and the body portion of the lock member are sequentially fitted to the ratchet, and then the projection portion and the body portion of the restriction member are sequentially fitted to the restriction recess portion. Thereafter, the projection portion and the body portion of the lock member are sequentially fitted to the lock recess portion. Accordingly, the relative rotation phase is restricted from changing in an opposite direction to thereby securely lock the relative rotation phase at the intermediate lock phase.

JP2010-138699A, which will be hereinafter referred to as Reference 3, discloses a variable valve timing control apparatus (a valve timing control apparatus) in which two lock members (lock pins) are fitted to two recess portions (lock holes) respectively to lock the relative rotation phase at the intermediate lock phase between the most advanced angle phase and the most retarded angle phase. In the variable valve timing control apparatus disclosed in Reference 3, in a case where a lock request is generated, an engine control circuit performs a phase variable control. During the phase variable control, in a case where an actual camshaft phase (an actual valve timing of the intake valve) does not move in the vicinity of the intermediate lock phase, the engine control circuit changes a control duty of a hydraulic control valve for a phase control by a predetermined amount so as to further move the actual camshaft phase. When the actual camshaft phase still does not move, it is determined that locking of the relative rotation phase is completed. It may be securely detected that the relative rotation phase is locked at the intermediate lock phase. Here, the actual camshaft phase is synonymous with the relative rotation phase. The actual camshaft phase is calculated by the engine control circuit based on detection signals of a cam angle sensor and a crank angle sensor.

In order to restrain a hitting sound caused by rotation or movement of the partition portion at the hydraulic chamber that is formed by the driving-side rotation member and the driven-side rotation member, a gap (clearance) formed between the lock member and the recess portion in a locked state at the intermediate lock phase is necessarily small. In order to reduce the aforementioned gap, dimensional accuracy of the lock member and the recess portion is necessarily increased. Nevertheless, the increase of dimensional accuracy may lead to cost increase at a time of mass production. In a case where the gap between the lock member and the recess portion is small, accuracy for positioning the lock member and the recess portion at the intermediate lock phase is necessarily increased when he relative rotation phase is shifted so that the locked state is established from an unlocked state. Certain time is required for obtaining the locked state to thereby disturb a prompt operation of the variable valve timing control apparatus.

The variable valve timing control apparatus disclosed in Reference 1 includes the two lock members and the two recess portions. One of the lock members is fitted to one of the recess portions to restrict the relative rotation in the advanced angle direction. The other of the lock members is fitted to the other of the recess portions to restrict the relative rotation in the advanced angle direction. Thus, in order to reduce the gap formed between each of the lock members and each of the recess portions in the locked state of the relative rotation, in addition to increasing accuracy of length dimensions of the lock members and the recess portions, angle dimensions between the two lock members and between the two recess portions are necessarily increased. Nevertheless, in order to achieve the fitting of two lock members relative to the two recess portions at the same time in the mass production, the number of dimensions on which accuracy control should be conducted is large. Thus, when considering dimension variations of components under the mass production, it is difficult to increase accuracy. Therefore, in practical, the gap between the lock member and the recess portion may be inhibited from being reduced and hitting sound may be inhibited from being restrained.

In the variable valve timing control apparatus disclosed in Reference 2, the single lock member is fitted to the single lock recess portion to lock the relative rotation phase at the intermediate lock phase. Thus, as compared to the variable valve timing control apparatus in Reference 1, the number of dimensions on which accuracy control is necessary is small, which may achieve a smaller gap between the lock member and the lock recess portion in the locked state of the relative rotation. Nevertheless, in a case where the relative rotation phase changes at a high speed to the intermediate lock phase in a state where the gap between the lock member and the recess portion is small and the relative rotation phase is in the vicinity of the most advanced angle phase, the lock member may pass over the intermediate lock phase without being fitted to the lock recess portion. A wrong operation may occur so that the lock member hits a wall of the ratchet and stops. In such case, in order to obtain the locked state, the aforementioned wrong operation in which the lock member has passed over the intermediate lock phase should be detected by a sensor, and the relative rotation phase should be shifted in an opposite direction based on a detection result by the sensor to obtain the locked state. At this time, it requires time for achieving the locked state, thereby disturbing the prompt operation of the variable valve timing control apparatus.

In the variable valve timing control apparatus disclosed in Reference 3, in a case where the lock request is made, the engine control circuit performs the phase variable control. In a case where the actual camshaft phase does not move in the vicinity of the intermediate lock phase during the control by the engine control circuit, the engine control circuit further changes the control duty of the hydraulic valve for the phase control so that the actual shaft phase moves by the predetermined amount. At a time when the lock request is made, the actual camshaft phase is not arranged at the intermediate lock phase. Thus, the engine control circuit controls the control duty of the hydraulic valve for the phase control to change so that the actual shaft phase moves towards a phase beyond the intermediate lock phase. According to the aforementioned control, the lock member may not surely fitted to the recess portion to achieve the locked state during the phase change and the locked state may not be obtained as the lock member passes over the recess portion. In a case where the engine control circuit determines that the actual camshaft phase has passed over the intermediate lock phase, the change direction of the actual camshaft phase is reversed and the actual camshaft phase is controlled towards the phase beyond the intermediate lock phase. The aforementioned series of control is repeated until the relative rotation phase is locked at the intermediate lock phase. The aforementioned state in which the actual camshaft phase does not move in the vicinity of the intermediate lock phase corresponds to the locked state at the intermediate lock phase, and also indicates a state where the intermediate lock phase is changeable by an amount corresponding to the gap between the lock member and the recess portion. In a case where the control duty of the hydraulic control valve for the phase control is further shifted by the predetermined amount in the direction to move the actual camshaft phase in the state where the actual camshaft phase does not move in the vicinity of the intermediate lock phase, and the actual camshaft phase is not changed from the vicinity of the intermediate lock phase, the engine control circuit determines that the actual camshaft phase is arranged at the intermediate lock phase and the locked state is achieved. Accordingly, the variable valve timing control apparatus in Reference 3 is intended to confirm whether the locked state is established after the actual camshaft phase is locked at the intermediate lock phase.

The engine control circuit is required to accurately calculate or determine that the actual camshaft phase is in the vicinity of the intermediate lock phase or beyond the intermediate lock phase, for example, i.e., to accurately calculate an actual value of the actual camshaft phase. Thus, the cam angle sensor and the crank angle sensor necessarily accurately detect a cam angle and a crank angle to output detection signals respectively. In addition, a difference in output timing of the respective detection signals by the cam angle sensor and the crank angle sensor is necessarily accurate. At this time, a difference may occur between the actual value of the actual camshaft phase and the calculated actual camshaft phase based on the cam angle sensor and the crank angle sensor, i.e., a detection error may occur. When the detection error occurs, the engine control circuit determines that the relative rotation is positioned at the intermediate lock phase though the relative rotation is not actually positioned at the intermediate lock phase and performs a locking confirmation operation, or determines that the relative rotation is not positioned at the intermediate lock phase though the relative rotation is actually positioned at the intermediate lock phase and reverses the change direction of the actual camshaft phase, for example, which may cause a wrong operation.

A need thus exists for a variable valve timing control apparatus which is not susceptible to the drawback mentioned above.

SUMMARY

According to an aspect of this disclosure, a variable valve timing control apparatus includes a driving-side rotation member rotating in synchronization with a crankshaft of an internal combustion engine, a driven-side rotation member arrange to be coaxial with the driving-side ration member and rotating in synchronization with a camshaft for opening and closing a valve of the internal combustion engine, an intermediate lock mechanism including first and second lock members provided at one of the driving-side rotation member and the driven-side rotation member to be movable, first and second recess portions provided at the other of the driving-side rotation member and the driven-side rotation member, and a guide groove continuously formed from a portion of at least one of the first and second recess portions, the intermediate lock mechanism being selectively switchable between a locked state in which a relative rotation phase of the driven-side rotation member relative to the driving-side rotation member is locked at an intermediate lock phase between a most advanced angle phase and a most retarded angle phase because of the first and the second lock members moving to be fitted to the first and second recess portions respectively and an unlocked state in which the locked state is released because of the first and the second lock members separating from the first and second recess portions respectively, a sensor detecting whether or not the relative rotation phase is changed, and a control portion controlling a relative rotation of the driven-side rotation member relative to the driving-side rotation member. The control portion performs a control for changing the relative rotation phase based on a request for changing the relative rotation phase from the unlocked state to the locked state so that the relative rotation phase is changed until a first stop state is established, the first stop state in which the change of the relative rotation phase is stopped, in a state where the relative rotation phase is in the unlocked state and one of the first and second lock members configured to be fitted to one of the first and second recess portions at which the guide groove is formed is positioned relative to the one of the first and second recess portions at which the guide groove is formed at a side opposite from a side where the guide groove is formed. The control portion performs a control for changing the relative rotation phase by reversing a change direction of the relative rotation phase after the first stop state is established so that the relative rotation phase is changed until a second stop state is established, the second stop state in which the change of the relative rotation phase is stopped.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
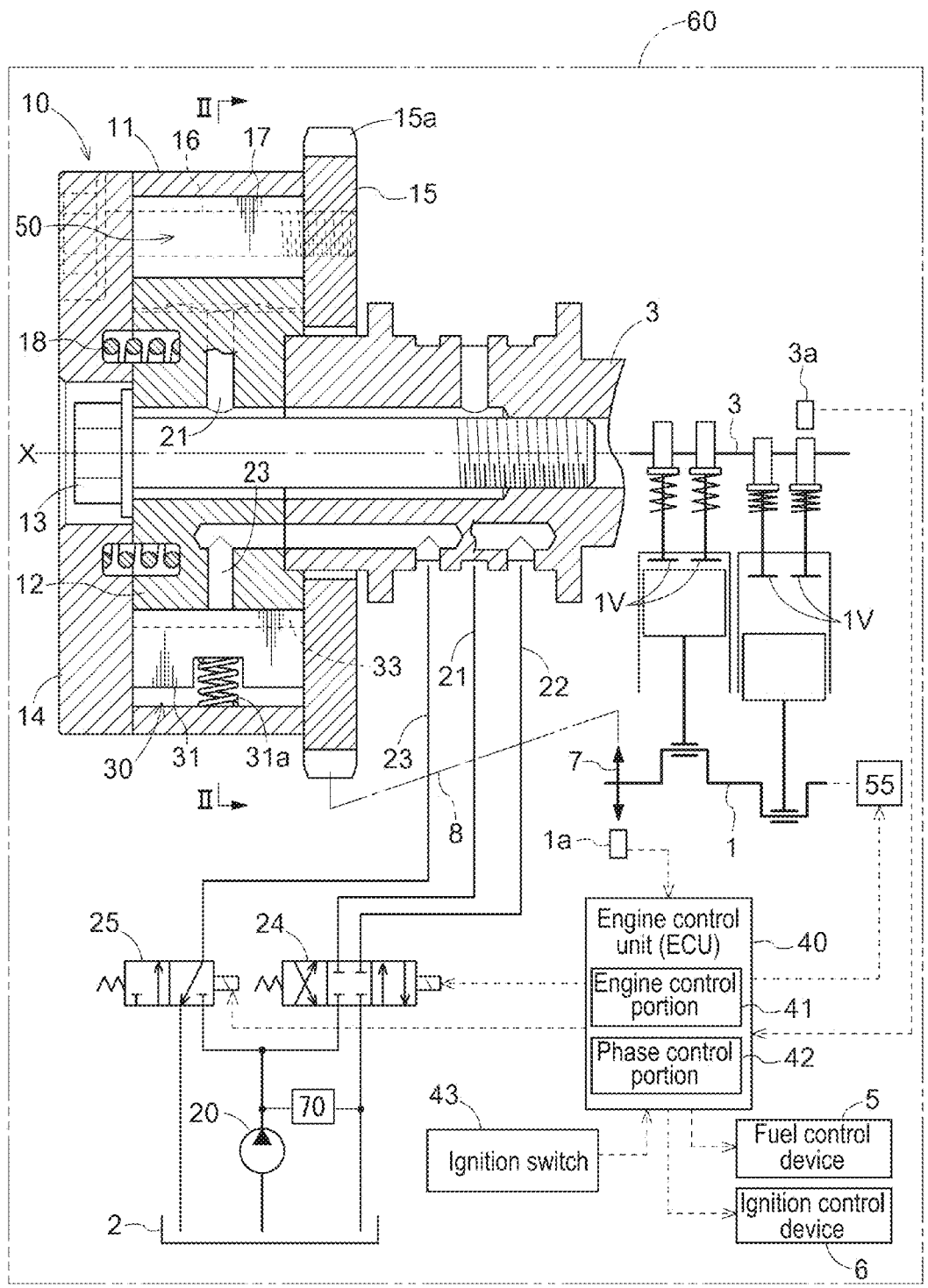
FIG. 1 is a longitudinal section view illustrating a configuration of a variable valve timing control apparatus according to an embodiment disclosed here.
Figure 2:
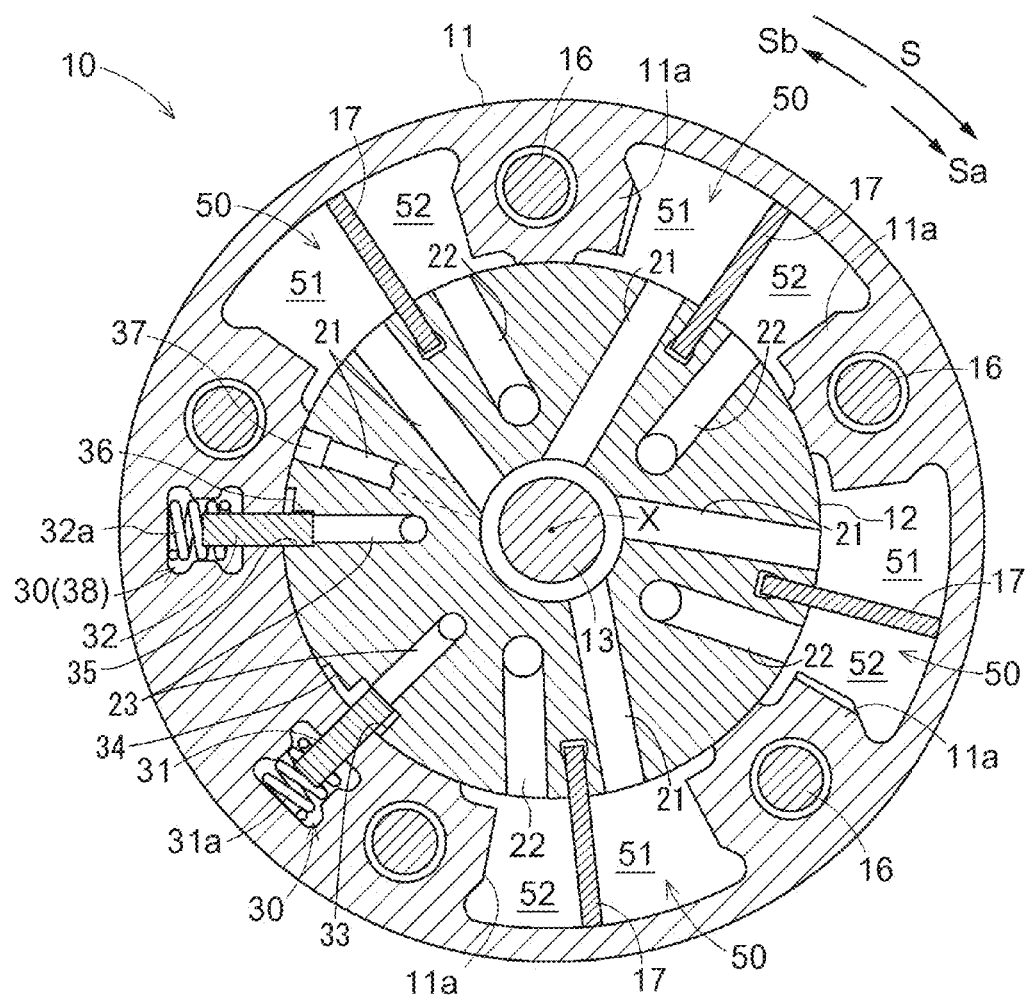
FIG. 2 is a cross-sectional view taken along line II-II in FIG. 1 and illustrating a locked state at an intermediate lock phase.

An embodiment will be explained with reference to the attached drawings. As illustrated in FIGS. 1 and 2, an internal combustion engine control system is configured to include an engine control unit (ECU) 40 for controlling an engine 60 serving as an internal combustion engine and a variable valve timing control apparatus 10 that specifies an opening and closing timing of an intake valve 1V of the engine 60.

The engine 60 illustrated in FIG. 1, which is mounted to a passenger vehicle, for example, includes a starter motor 55 transmitting a drive rotation force to a crankshaft 1, a fuel control device 5 controlling a fuel injection relative to an intake port or a combustion chamber, an ignition control device 6 controlling an ignition of a spark plug, a crank angle sensor 1a detecting a rotation angle and a rotation speed of the crankshaft 1, and a cam angle sensor 3a detecting a rotation angle of a camshaft 3.

The ECU 40 includes an engine control portion 41 and a phase control portion 42 serving as a control portion. The engine control portion 41 performs an automatic start and an automatic stop, for example, of the engine 60. The phase control portion 42 controls a relative rotation phase and a lock mechanism of the variable valve timing control apparatus 10. Control structure and method related to the ECU 40 will be explained later.

As illustrated in FIG. 1, the variable valve timing control apparatus 10 includes an outer rotor 11 serving as a driving-side rotation member that rotates in synchronization with the crankshaft 1 of the engine 60, and an inner rotor 12 serving as a driven-side rotation member connected via a connection bolt 13 to the camshaft 3 for opening and closing the intake valve 1V in a combustion chamber of the engine 60. The inner rotor 12 is arranged coaxially with an axis (an axial line) X of the camshaft 3. The inner rotor 12 and the outer rotor 11 are configured to be relatively rotatable about the axis X.

The inner rotor 12 and the outer rotor 11 are arranged coaxially with the axis X. The outer rotor 11 is tightened by a fastening bolt 16 in a state to be sandwiched between a front plate 14 and a rear plate 15. A timing sprocket 15a is formed at an outer periphery of the rear plate 15. The camshaft 3 at an intake side is connected to an end portion of the inner rotor 12 facing the rear plate 15.

As illustrated in FIG. 1, a torsion spring 18 is disposed between the inner rotor 12 and the front plate 14 to generate a biasing force until the relative rotation phase of the inner rotor 12 relative to the outer rotor 11 (which will be hereinafter simply referred to as the "relative rotation phase") reaches an intermediate lock phase P1 from a state where the relative rotation phase is positioned at a most retarded angle. Alternatively, the torsion spring 18 may generate the biasing force so that the relative rotation phase goes beyond the first intermediate lock phase P1 or fails to reach the first intermediate lock phase P1.

In the variable valve timing control apparatus 10, a timing chain 8 is wound over an output sprocket 7 provided at the crankshaft 1 of the engine 60 and the timing sprocket 15a of the outer rotor 11 so that the outer rotor 11 rotates in synchronization with the crankshaft 1. An apparatus including a similar configuration to that of the variable valve timing control apparatus 10 is provided at an end portion (i.e., a front end portion) of the camshaft 3 at an exhaust side, which is not shown in drawings. A rotation force is also transmitted from the timing chain 8 to the apparatus.

As illustrated in FIG. 2, plural projection portions 11a are integrally formed at the outer rotor 11 to project towards the axis X, i.e., project radially inwardly. The inner rotor 12 is formed in a column form that includes an outer periphery tightly in contact with projection ends of the respective projection portions 11a of the outer rotor 11. Accordingly, a fluid chamber 50 is formed and defined between the projection portions 11a adjacent to each other in a rotation direction of the outer rotor 11. Plural vanes 17 are fitted in at an outer periphery of the inner rotor 12 so as to project towards the fluid chambers 50 respectively. Each of the fluid chambers 50 is divided by the vane 17 into an advanced angle chamber 51 and a retarded angle chamber 52 in the rotation direction of the outer rotor 11.

In the variable valve timing control apparatus 10, the outer rotor 11 receives a driving force from the crankshaft 1 to rotate in a driving rotation direction S. In the present embodiment, a direction in which the inner rotor 12 rotates in the same direction as the driving rotation direction S relative to the outer rotor 11 is defined to be an advanced angle direction Sa. In addition, a direction in which the inner rotor 12 rotates in an opposite direction from the advanced angle direction Sa relative to the outer rotor 11 is defined to be a retarded angle direction Sb. According to the variable valve timing control apparatus 10 of the present embodiment, the relation between the crankshaft 1 and the camshaft 3 is specified so that a compression ratio of intake air is enhanced in association with an increase of a displacement amount (a change amount) obtained when the relative rotation phase is displaced or changed in the advanced angle direction Sa. In addition, the compression ratio of intake air is reduced in association with an increase of the displacement amount in a case where the relative rotation phase is displaced in the retarded angle direction Sb.

Hydraulic oil serving as fluid is supplied to each of the advanced angle chambers 51 so that the relative rotation phase is shifted in the advanced angle direction Sa. On the other hand, the hydraulic oil is supplied to each of the retarded angle chambers 52 so that the relative rotation phase is shifted in the retarded angle direction Sb. The relative rotation phase obtained in a state where the vane 17 is positioned at a moving end (i.e., a pivotal end relative to the axis X) in the advanced angle direction Sa is defined to be a most advanced angle phase while the relative rotation phase obtained in a state where the vane 17 is positioned at a moving end (i.e., a pivotal end relative to the axis X) in the retarded angle direction Sb is defined to be a most retarded angle phase. In this case, the most advanced angle phase includes not only the moving end in the advanced angle direction Sa of the vane 17 but also the vicinity of the moving end in the advanced direction Sa. In the same way, the most retarded angle phase includes not only the moving end in the retarded angle direction Sb of the vane 17 but also the vicinity of the moving end in the retarded angle direction Sb.

The inner rotor 12 includes an advanced angle control oil passage 21 connected to each of the advanced angle chambers 51, a retarded angle control oil passage 22 connected to each of the retarded angle chambers 52, and a lock release oil passage 23 supplying the hydraulic oil to the lock mechanism, specifically, two lock mechanisms which will be explained later. According to the variable valve timing control apparatus 10 of the embodiment, lubricant oil stored at an oil pan 2 of the engine 60 is used as the hydraulic oil that is supplied to the advanced angle chambers 51 or the retarded angle chambers 52.

The variable valve timing control apparatus 10 includes the two lock mechanisms, i.e., an intermediate lock mechanism 30 and a most retarded angle lock mechanism 38. The intermediate lock mechanism 30 includes a function to selectively lock the relative rotation phase at the intermediate lock phase P1 as illustrated in FIG. 2 and release a state in which the relative rotation phase is locked at the intermediate lock phase P1. The most retarded angle lock mechanism 38 includes a function to selectively lock the relative rotation phase at a most retarded angle lock phase P2 corresponding to the most retarded angle phase and release a state in which the relative rotation phase is locked at the most retarded angle lock phase P2.

The intermediate lock phase P1 is specified at a predetermined phase between the most advanced angle phase serving as an operating end in the advanced angle direction Sa, and the most retarded angle phase serving as an operating end in the retarded angle direction Sb. The intermediate lock phase P1 is a phase in which the engine 60 at a low temperature state may be effectively started. The most retarded angle lock phase P2 is a phase in which HC emissions may be reduced during the idling of the engine 60 after the start of the engine 60.

The intermediate lock mechanism 30 and the most retarded angle lock mechanism 38 are configured and constituted by a combination of a first lock member 31, a second lock member 32, a first recess portion 33, a second recess portion 35, and a third recess portion 37.

Each of the first lock member 31 and the second lock member 32 formed by a plate member is supported by the outer rotor 11 so as to be movable (i.e., to approach and separate) relative to the outer rotor 11. Each of the first lock member 31 and the second lock member 32 is configured to approach and separate relative to the axis X while keeping parallel to the axis X. The first lock member 31 moves towards the inner rotor 12 by a biasing force of a first spring 31a while the second lock member 32 moves towards the inner rotor 12 by a biasing force of a second spring 32a.

The first recess portion 33 is defined and formed at the outer periphery of the inner rotor 12 in a groove shape along the axis X. The width of the first recess portion 33 in a circumferential direction of the inner rotor 12 is sufficiently or adequately greater than the thickness (i.e., substantially circumferential length) of the first lock member 31. A first guide groove 34 serving as a guide groove and formed by a shallower groove than the first recess portion 33 (i.e., the depth of the first guide groove 34 is smaller than the depth of the first recess portion 33) is continuously formed at an end portion of the first recess portion 33 in the advanced angle direction Sa. The first guide groove 34 serves as an example of a guide groove. The first recess portion 33 and the first guide groove 34 collectively form a groove that includes a so-called ratchet mechanism so that the depth (i.e., radial length) of the groove increases in two steps, i.e., in a stepped manner, in the retarded angle direction Sb. At this time, however, as long as the first recess portion 33 includes a certain width so that the first lock member 31 is surely fitted to the first recess portion 33 even with a high shifting speed (a high change speed) of the relative rotation phase, the first guide groove 34 may not be formed.

The second recess portion 35 is defined and formed at the outer periphery of the inner rotor 12 in a groove shape along the axis X. The depth (i.e., radial length) of the second recess portion 35 is the same as the first recess portion 33. The width of the second recess portion 35 in the circumferential direction is slightly greater than the thickness of the second lock member 32. Specifically, a gap (clearance) defined between the second recess portion 35 and the second lock member 32 in the circumferential direction is specified so that a generation of hitting sound in a case where the second lock member 32 hits the second recess portion 35 is restrained and the second lock member 32 is surely removed or separated from the second recess portion 35. In addition, the aforementioned gap is specified so that the second lock member 32 and the second recess portion 35 may be smoothly fitted to each other. A second guide groove 36 serving as the guide groove and formed by a shallower groove than the second recess portion 35 (i.e., the depth of the second guide groove 36 is smaller than the depth of the second recess portion 35) is continuously formed at an end portion of the second recess portion 35 in the advanced angle direction Sa. The second guide groove 36 serves as an example of the guide groove. The second recess portion 35 and the second guide groove 36 collectively form a groove that includes a so-called ratchet mechanism so that the depth (i.e., radial length) of the groove increases in two steps, i.e., in a stepped manner, in the retarded angle direction Sb. Because of the second guide groove 36, even in a case where the width of the second recess portion 35 in the circumferential direction is small, the second lock member 32 is securely fitted to the second recess portion 35 when the relative rotation phase is shifted to the intermediate lock phase P1 from the most retarded angle phase P2 at the high shifting speed.

The third recess portion 37 is defined and formed in a groove shape along the axis of the inner rotor 12 (i.e., the axis X). The depth (i.e., radial length) of the third recess portion 37 is the same as the first recess portion 33 and the second recess portion 35. The width of the third recess portion 37 in the circumferential direction is the same as the second recess portion 35.

As illustrated in FIG. 2, the first lock member 31 is fitted to the first recess portion 33 and the second lock member 32 is fitted to the second recess portion 35 at the intermediate lock phase P1. The restriction of the relative rotation phase from shifting or changing in the advanced angle direction Sa and the retarded angle direction Sb at the intermediate lock phase P1 is achieved by the fitting between the second lock member 32 and the second recess portion 35. That is, even when the relative rotation phase is shifted by an amount corresponding to the gap that is formed between the second lock member 32 and the second recess portion 35 in a state where the second lock member 32 is fitted to the second recess portion 35 (hereinafter referred to as a fitting gap), the first lock member 31 is inhibited from making contact with a wall surface of the first recess portion 33 extending in the radial direction. The fitting gap should be small for maintaining an angle variation of the intermediate lock phase P1 within a specified range and reducing a hitting sound that occurs in a case where the second lock member 32 hits the second recess portion 35. According to the configuration of the present embodiment, a dimension accuracy control on the single lock member and the single recess portion is simply required to thereby reduce the size of the fitting gap defined in a state where the relative rotation phase is locked at the intermediate lock phase P1 (corresponding to a locked state which will be explained blow).

As mentioned above, the intermediate lock mechanism 30 is constituted by the first lock member 31, the first recess portion 33, the second lock member 32, and the second recess portion 35 to thereby lock the relative rotation phase at the intermediate lock phase P1, i.e., the relative rotation phase is in the locked state. A state where the first lock member 31 and the second lock member 32 are separated or removed from the first recess portion 33 and the second recess portion 35 respectively so that the relative rotation phase is changeable corresponds to an unlocked state of the relative rotation phase.

After the first lock member 31 and the second lock member 32 are removed from the first recess portion 33 and the second recess portion 35 respectively in a state where the relative rotation phase is positioned at the intermediate lock phase P1, the relative rotation phase is further shifted in the retarded angle direction Sb so that the second lock member 32 may be fitted to the third recess portion 37. The thus obtained phase is the most retarded angle lock phase P2.

In the variable valve timing control apparatus 10 of the embodiment, the exclusive lock member and recess portion are not required for each of the intermediate lock mechanism 30 and the most retarded angle lock mechanism 38. Each of the intermediate lock mechanism 30 and the most retarded angle lock mechanism 38 are constituted by the combination of the first lock member 31, the second lock member 32, the first recess portion 33, the second recess portion 35, and the third recess portion 37. Thus, the number of components of the variable valve timing control apparatus 10 is reduced to thereby decrease cost and size of the variable valve timing control apparatus 10.

As illustrated in FIG. 1, the engine 60 includes a hydraulic pump 20 that suctions the lubricant oil in the oil pan 2 by the driving force of the engine 60 so as to send out the lubricant oil as the hydraulic oil. The internal combustion engine control system in the present embodiment includes a phase control valve 24 including a solenoid controlled type and a lock release control valve 25 including a solenoid controlled type. The hydraulic oil discharged from the hydraulic pump 20 is selectively supplied to the advanced angle chambers 51 and the retarded angle chambers 52 by means of the phase control valve 24. The hydraulic oil discharged from the hydraulic pump 20 is supplied to the lock release oil passage 23 by means of the lock release control valve 25. Specifically, the hydraulic pump 20, the phase control valve 24, the lock release control valve 25, and the oil passages relative to which the hydraulic oil is supplied and discharged constitute a fluid control mechanism of the variable valve timing control apparatus 10.

The phase control valve 24 serves as a solenoid valve that is operated to be switchable between an advanced angle position, a retarded angle position, and a neutral position by a control signal from the ECU 40. In the advanced angle position, the hydraulic oil discharged from the hydraulic pump 20 flows through the advanced angle control oil passage 21 to be supplied to the advanced angle chambers 51 while the hydraulic oil in the retarded angle chambers 52 is discharged through the retarded angle control oil passage 22.

In the retarded angle position, the hydraulic oil discharged from the hydraulic pump 20 flows through the retarded angle control oil passage 22 to be supplied to the retarded angle chambers 52 while the hydraulic oil in the advanced angle chambers 51 is discharged through the advanced angle control oil passage 21. In the neutral position, the supply and discharge of hydraulic oil is not performed for the advanced angle chambers 51 or the retarded angle chambers 52. When an electric power is supplied to the phase control valve 24 in a state where the duty ratio is 100%, the phase control valve 24 is brought to the advanced angle position. In a case where the electric power is supplied to the phase control valve 24 in a state where the duty ratio is 50%, the phase control valve 24 is brought to the neutral position. In a case where the supply of electric power is interrupted to the phase control valve 24, the phase control valve 24 is brought to the retarded angle position.

The lock release control valve 25 serves as a solenoid valve that is operated to be switchable between an unlocked position and a locked position by a control signal from the ECU 40. In the unlocked position, the hydraulic oil discharged from the hydraulic pump 20 flows through the lock release oil passage 23 to be supplied to the first recess portion 33, the second recess portion 35, and the third recess portion 37. In the locked position, the hydraulic oil is discharged through the lock release oil passage 23 from the first recess portion 33, the second recess portion 35, and the third recess portion 37 so that the first lock member 31 may be fitted to the first recess portion 33, and the second lock member 32 may be fitted to the second recess portion 35 or the third recess portion 37. In a case where the electric power is supplied to the lock release control valve 25, the lock release control valve 25 is brought to the locked position. The lock release control valve 25 is brought to the unlocked position when the supply of the electric power is interrupted.

In the embodiment, the phase control valve 24 is used for controlling the relative rotation phase. Then, the lock release control valve 25 is used individually and separately from the phase control valve 24 for controlling the locking of the relative rotation phase. Alternatively, as long as the advanced angle control oil passage 21, the retarded angle control oil passage 22, and the lock release oil passage 23 are individually formed from one another, a valve including a single solenoid for controlling both the relative rotation phase and the locking may be used.

As illustrated in FIG. 1, the ECU 40 inputs signals from the crank angle sensor 1a, the cam angle sensor 3a, and an ignition switch 43. The ECU 40 outputs signals for controlling each of the starter motor 55, the fuel control device 5, and the ignition control device 6, and signals for controlling the phase control valve 24 and the lock release control valve 25.

The ignition switch 43 serves as a switch for starting the internal combustion engine control system. The ignition switch 43 is turned on for starting the engine 60 and is turned off for stopping the engine 60. The engine control portion 41 achieves start and stop of the engine 60 based on the operation of the ignition switch 43.

The phase control portion 42 detects, by calculation, an absolute value of the relative rotation phase between the outer rotor 11 and the inner rotor 12 based on the detection signal of the crank angle detected by the crank angle sensor 1a and the detection signal of the cam angle detected by the cam angle sensor 3a (which will be hereinafter referred to as "the relative rotation phase is detected"). Whether the change direction (shifting direction) of the relative rotation phase is in the advanced angle direction Sa, in the retarded angle direction Sb, or the relative rotation phase is not shifted is determined on a basis of a difference in output timing (i.e., time difference) of the detection signals of the crank angle sensor 1a and the cam angle sensor 3a. In addition, the phase control portion 42 performs a timing control of the intake valve 1V by the variable valve timing control apparatus 10 at the start of the engine 60, controls the relative rotation phase and the lock mechanism of the variable valve timing control apparatus 10 during the operation of the engine 60, specifies the relative rotation phase at the stop of the engine 60 based on circumstances in a case where the engine 60 is stopped, and achieves the shifting to the locked state by the lock mechanism.

Next, a control for stopping the engine 60 from a state in which the engine 60 is operated with the relative rotation phase at the most advanced angle, i.e., a control for bringing the relative rotation phase to the locked state at the intermediate lock phase from the most advanced angle phase, will be explained.

In a case where the relative rotation phase is shifted from the most advanced angle phase to the intermediate lock phase P1, the shifting (change) of the relative rotation phase may be stopped by the following four reasons. That is, in a state where the first and second guide grooves 34 and 36 are formed at the same sides of the first and second recess portions 33 and 35 respectively in the circumferential direction and in a case where the relative rotation phase is in the unlocked state and the relative rotation phase is shifted to the intermediate lock phase P1 from a state where the first and second lock members 31 and 32 are positioned, relative to the first and second recess portions 33 and 35, at a side opposite from a side where the first and second guide grooves 34 and 36 are formed, the shifting (change) of the relative rotation phase may be stopped by the following four reasons. First, the first lock member 31 and the second lock member 32 are fitted to the first recess portion 33 and the second recess portion 35 respectively. Second, the first lock member 31 is fitted to the first recess portion 33, and the second lock member 32 is not fitted to the second recess portion 35 and is engaged at the second recess portion 35. Third, the first lock member 31 is not fitted to the first recess portion 33 and is engaged at the first guide groove 34, and the second lock member 32 is not fitted to the second recess portion 35 and is engaged at the second guide groove 36. Fourth, the first lock member 31 is not fitted to the first recess portion 33 and is engaged at the first guide groove 34, and the second lock member 32 is not fitted to the second recess portion 35 or the second guide groove 36. In a case of the first reason, the relative rotation phase is appropriately locked at the intermediate lock phase P1. The aforementioned three reasons correspond to first, second, and third operations respectively which will be explained below. In the first, second, and third operations, the relative rotation phase goes beyond the intermediate lock phase P1. In a case where the relative rotation phase is shifted from the most advanced angle phase towards the intermediate lock phase P1, the relative rotation phase is inhibited from changing to the most retarded angle phase without the fitting of the first lock member 31 to the first recess portion 33 or the first guide groove 34, and the second lock member 32 to the second recess portion 35 or the second guide groove 36.

Figure 3:
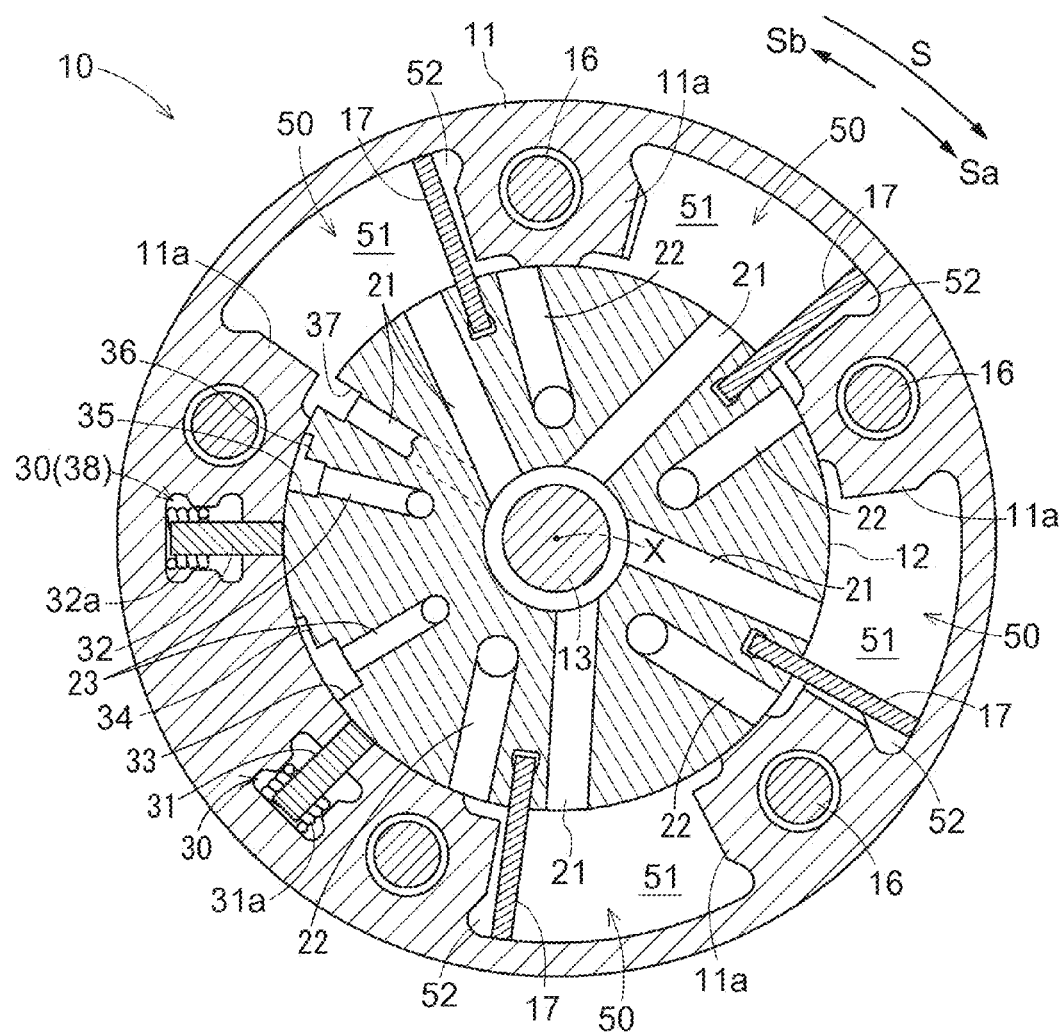
FIG. 3 is a cross-sectional view illustrating a most advanced angle phase of the variable valve timing control apparatus.
Figure 5:
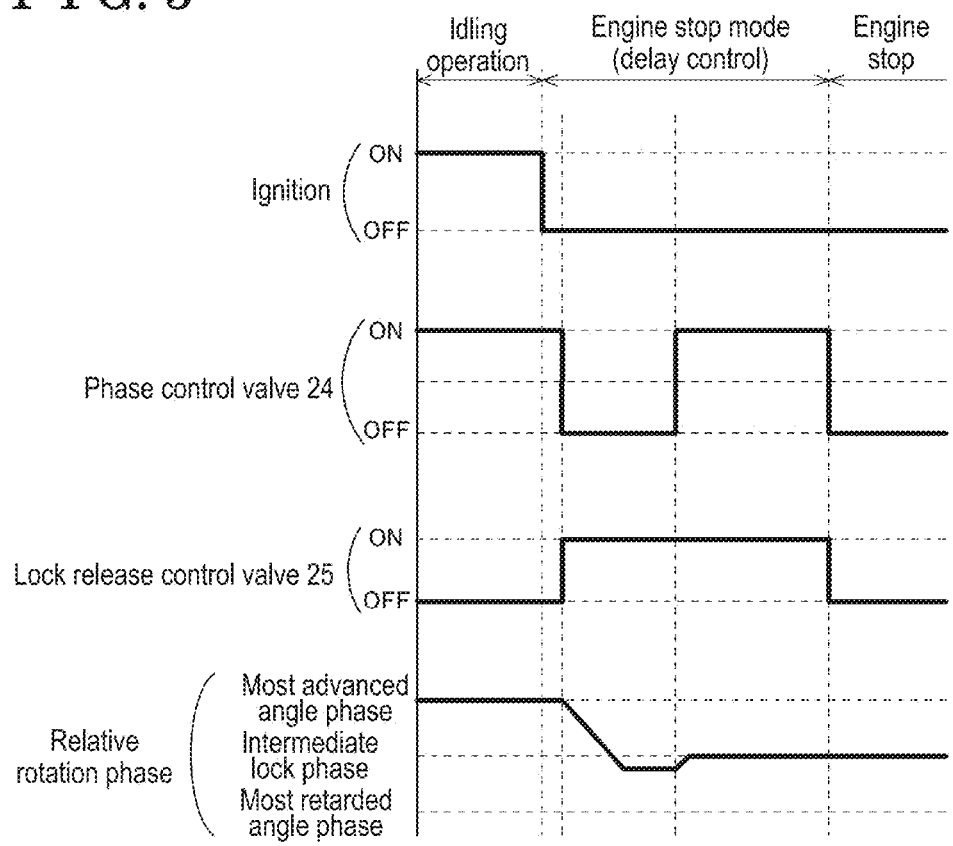
FIG. 5 is a time chart of a control of the variable valve timing control apparatus in a state where a relative rotation phase at a most advanced angle phase is shifted in a retarded angle direction to be brought to a locked state at an intermediate lock phase according to the embodiment.

The state of the variable valve timing control apparatus 10 in which the relative rotation phase is at the most advanced angle phase is illustrated in FIG. 3. In the aforementioned state, as illustrated in FIG. 5, the electric power is supplied to the phase control valve 24 in a state where the duty ratio is 100% so that the phase control valve 24 is maintained at the advanced angle position. The power supply to the lock release control valve 25 is interrupted so that the lock release control valve 25 is arranged in the unlocked position. In a case where the ignition switch 43 is turned off from the aforementioned state, the engine 60 is not immediately stopped, i.e., a delay control is performed so that the engine 60 is stopped after the relative rotation phase is shifted in the retarded angle direction Sb and is locked at the intermediate lock phase P1 (engine stop mode).

As illustrated in FIG. 5, in a case where the ignition switch 43 is turned off, the phase control portion 42 performs a control to block the power supply to the phase control valve 24 so that the phase control valve 24 is switched to the retarded angle position. At the same time, the phase control portion 42 performs a control to supply power to the lock release control valve 25 so that the lock release control valve 25 is switched to the locked position. Accordingly, the hydraulic oil is discharged from the first recess portion 33, the second recess portion 35, and the third recess portion 37.

Figure 4:
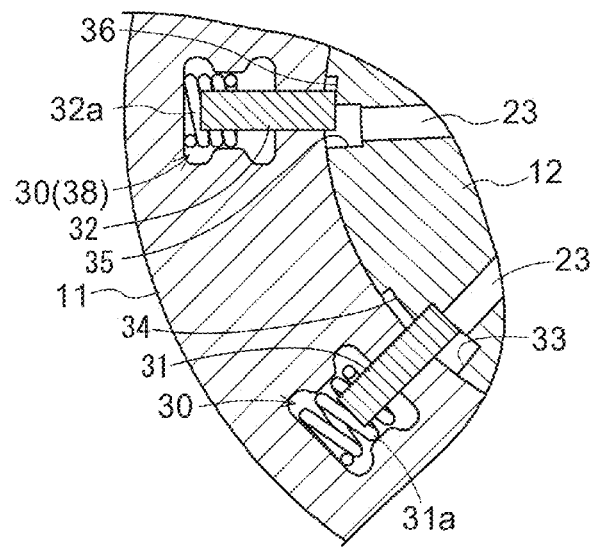
FIG. 4 is a cross-sectional view illustrating a first stop state in a first operation of the variable valve timing control apparatus according to the embodiment.

In a case where the shifting speed (change speed) of the relative rotation phase in the retarded angle direction Sb is high, the first lock member 31 and the second lock member 32 may not be accurately fitted to the first recess portion 33 and the second recess portion 35 respectively so that the relative rotation phase may move beyond the intermediate lock phase P1 even in a case where the hydraulic oil is discharged from the first recess portion 33 and the second recess portion 35 before the first lock member 31 and the second lock member 32 face the first recess portion 33 and the second recess portion 35 respectively. At this time, as illustrated in FIG. 4, even though the first lock member 31 is fitted to the first recess portion 33, the first lock member 31 hits the wall surface of the first recess portion 33 at a side in the advanced angle direction Sa and stops in a state being inhibited from further moving in the retarded angle direction Sb. At this time, the second lock member 32 fails to be fitted to the second recess portion 35 and is engaged at the second guide groove 36. In the embodiment, a state in which the second lock member 32 stops after passing over the intermediate lock phase P1 in the control to change the relative rotation phase in the retarded angle direction Sb is referred to as a first stop state.

In the first stop state, the difference in output timing of the detection signals of the crank angle sensor 1a and the cam angle sensor 3a is not changed. Thus, the phase control portion 42 determines that the shifting (change) of the relative rotation phase is stopped. Then, after an elapse of a predetermined time period from the establishment of the first stop state, the phase control portion 42 controls the relative rotation direction of the inner rotor 12 relative to the outer rotor 11 to reverse from the retarded angle direction Sb to the advanced angle direction Sa. As illustrated in FIG. 4, the relative rotation phase is allowed to change in the advanced angle direction Sa. Because the second lock member 32 has been already fitted to the second guide groove 36, the second lock member 32 surely hits a wall surface of the second recess portion 35 at a side in the retarded angle direction Sb in a case where the relative rotation phase changes in the advanced angle direction Sa even at the fast shifting speed. As a result, as illustrated in FIG. 2, the first lock member 31 and the second lock member 32 are fitted to the first recess portion 33 and the second recess portion 35 respectively to thereby securely lock the relative rotation phase at the intermediate lock phase P1.

Accordingly, even in a case where the relative rotation phase goes beyond the intermediate lock phase P1, the phase control portion 42 detects the stop of shifting (change) of the relative rotation phase and controls the relative rotation phase so that the relative rotation direction of the inner rotor 12 relative to the outer rotor 11 is reversed to the advanced angle direction Sa from the retarded angle direction Sb. As a result, even with a small fitting gap, the relative rotation phase may be shifted from the most retarded angle lock phase P2 to the intermediate lock phase P1 for a short time period and the locked state may be securely obtained.

At the time the relative rotation phase is locked at the intermediate lock phase P1, the change (shifting) of the relative rotation phase is again stopped. In the present embodiment, in the control to reverse the relative rotation direction to the advanced angle direction Sa from the first stop state, a state where the second lock member 32 is again stopped is referred to as a second stop state. Because of the second lock member 32 that reaches the second stop state, the phase control portion 42 may determine that the relative rotation phase is locked at the intermediate lock phase P1. Then, based on the determination of the phase control portion 42 that the relative rotation phase is locked at the intermediate lock phase P1, the engine control portion 41 stops the engine 60.

As mentioned above, the phase control portion 42 performs the control to reverse the relative rotation direction of the inner rotor 12 relative to the outer rotor 11 to the advanced angle direction Sa from the retarded angle direction Sb based on the stop of change (shifting) of the relative rotation phase. That is, the phase control portion 42 is inhibited from reversing the relative rotation direction based on a fact that the absolute value of the relative rotation phase is at the retarded angle side relative to the intermediate lock phase P1. In addition, the phase control portion 42 determines that the relative rotation phase is locked at the intermediate lock phase P1 based on the second stop of the change of the relative rotation phase. That is, the phase control portion 42 is inhibited from reversing the relative rotation direction based on a fact that the absolute value of the relative rotation phase is at the intermediate lock phase P1. Because the phase control portion 42 utilizes the stop of change of the relative rotation phase, not the absolute value of the relative rotation phase, as a basis for determination of the reverse of the relative rotation direction or the establishment of the locked state, for example, the following advantages may be obtained.

Figure 6:
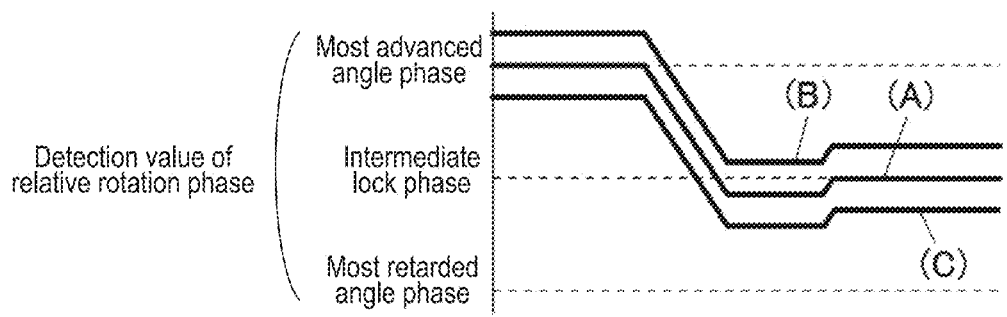
FIG. 6 is a time chart illustrating a change of the relative rotation phase in a state where the relative rotation phase at the most advanced angle phase is brought to the locked state at the intermediate lock phase when a detection error occurs.

Each of the crank angle sensor 1a and the cam angle sensor 3a normally outputs one pulse per one rotation. The phase control portion 42 detects the relative rotation phase based on timing difference in generation of pulses by the crank angle sensor 1a and the cam angle sensor 3a. In a case where the relative rotation phase changes, the timing difference in generation of pulses changes, so that the phase control portion 42 detects the relative rotation phase after the change. Nevertheless, in a case where elongation, fluttering, or fluctuation of the timing chain 8 that is wound between the crankshaft 1 and the camshaft 3 occurs, for example, the timing difference in generation of pulses may occur. As a result, a difference between an absolute value of the actual relative rotation phase and a detection value of the relative rotation phase detected by the phase control portion 42 may exceed a specified angle range (which will be hereinafter referred to as a detection error). In addition, in a case where each of the crank angle sensor 1a and the cam angle sensor 3a outputs a detection signal of an angle which is deviated from an angle that should be output because of breakage or the like, the detection error may also occur. The shifting of the relative rotation phase from the most retarded angle lock phase P2 to the intermediate lock phase P1 with the occurrence of the detection error is shown in FIG. 6. The detection error in a normal state is approximately 3 CA (crank angle) to 5 CA in the variable valve timing control apparatus 10 in which a shifting amount of the relative rotation phase is 80 degrees.

In FIG. 6, detection values of the relative rotation phase detected by the phase control portion 42 are indicated. A line A indicates the detection value that is equal to the absolute value of the actual relative rotation phase, i.e., the detection value in a state where the detection error does not occur. A line B indicates the detection value that is deviated to the advanced angle side from the absolute value of the actual relative rotation phase. A line C indicates the detection value that is deviated, in the opposite way from the line B, to the retarded angle side from the absolute value of the actual relative rotation phase. In the aforementioned cases indicated by the lines A, B, and C, when the relative rotation phase is shifted in the retarded angle direction Sb from the most advanced angle phase and the first stop state as illustrated in FIG. 4 is established, the respective absolute values of the actual relative rotation phase are the same among the cases of the lines A, B, and C though the respective detection values of the relative rotation phase are different from one another, and the relative rotation phase is inhibited from further changing in the retarded angle direction Sb. Then, after the first stop state continues for the predetermined time period, the phase control portion 42 changes the relative rotation direction to the advanced angle direction Sa regardless of the absolute value of the relative rotation phase. Accordingly, the relative rotation phase is shifted in the advanced angle direction Sa in all the cases indicated by the lines A, B, and C. Then, when the second lock member 32 is fitted to the second recess portion 35 so that the relative rotation phase is locked at the intermediate lock phase P1, the change of the relative rotation phase is stopped in all the cases of the lines A, B, and C and the second stop state is established. In the second stop state, the detection value in each of the lines B and C is deviated from the intermediate lock phase P1, however, the absolute value of the actual relative rotation phase is at the intermediate lock phase P1. The phase control portion 42 determines the locked state of the relative rotation phase by the establishment of the second stop state.

Even in a case where the detection error occurs as in the cases of the lines B and C, the phase control portion 42 accurately determines that the relative rotation phase is locked at the intermediate lock phase P1. That is, even in a case where the timing difference in generation of pulses of the detection signals of the crank angle sensor 1a and the cam angle sensor 3a includes a deviation, the phase control portion 42 may determine that the change (shifting) of the relative rotation phase is stopped as long as the aforementioned timing difference including a deviation continues for the predetermined time period. Based on the determination that the change of the relative rotation phase is stopped, the control for reversing the relative rotation direction and the determination of the locked state may be performed.

According to the present embodiment, information on whether the relative rotation phase is changing or stopped is obtained from the crank angle sensor 1a and the cam angle sensor 3a. Nevertheless, means for obtaining such information is not limited to the crank angle sensor 1a and the cam angle sensor 3a. Information on whether the relative rotation phase is changing or stopped may be acquired by a hydraulic sensor 70 (see FIG. 1), for example.

The hydraulic sensor 70 detects a pressure of hydraulic oil (hydraulic oil pressure) discharged from the hydraulic pump 20. The hydraulic oil pressure is low in a state where the relative rotation phase is changing because the hydraulic oil that is supplied to or discharged from the advanced angle chambers 51 and the retarded angle chambers 52 is circulating. On the other hand, in a case where the change of the relative rotation phase is stopped, the circulation of hydraulic oil is stopped but the hydraulic pump 20 is operated. Thus, the hydraulic oil pressure is high as compared to the hydraulic oil pressure obtained when the hydraulic oil is circulating. Accordingly, based on the detection of the hydraulic oil pressure by the hydraulic sensor 70, the phase control portion 42 may obtain information on whether the relative rotation phase is changing or stopped to thereby reverse the relative rotation direction and determine the locked state, for example.

The operation of the variable valve timing control apparatus 10 in a case where the relative rotation phase changes so as to stop after passing over the intermediate lock phase P1 from the most advanced angle phase and thereafter reverse to be brought to the locked state at the intermediate lock phase P1 is not limited to the aforementioned first operation. Hereinafter, the second operation and the third operation will be explained with reference to the attached drawings. The second operation and the third operation are different from the first operation in that the first stop state is established by the different relative rotation phase from the relative rotation phase in the first operation. The other portions of the second operation and the third operation are the same as the first operation.

Figure 7:
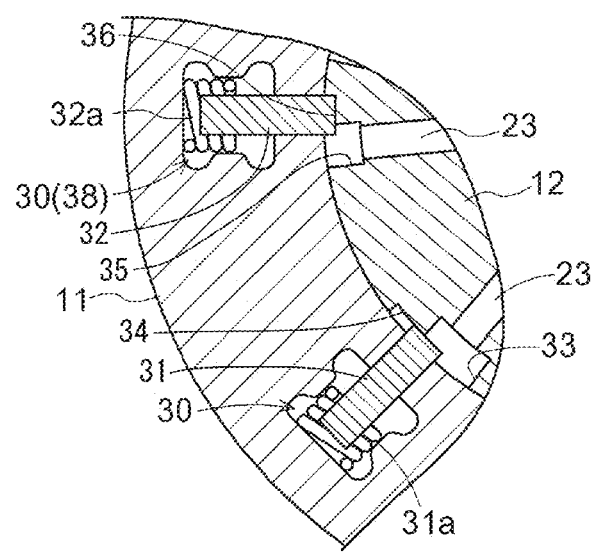
FIG. 7 is a cross-sectional view illustrating the first stop state in a second operation of the variable valve timing control apparatus according to the embodiment.

In the second operation, in a case where the relative rotation phase is shifted in the retarded angle direction Sb from the most advanced angle phase, the first lock member 31 and the second lock member 32 fail to be fitted to the first recess portion 33 and the second recess portion 35 respectively and the relative rotation phase goes beyond the intermediate lock phase P1. At this time, as illustrated in FIG. 7, the first lock member 31 fails to be fitted to the first recess portion 33 and is engaged at the first guide groove 34. The second lock member 32 also fails to be fitted to the second recess portion 35 and is engaged at the second guide groove 36. The second lock member 32 hits a wall surface of the second guide groove 36 in the advanced angle direction Sa so that the relative rotation phase is inhibited from further changing in the retarded angle direction Sb. The state where the second lock member 32 hits the wall surface of the second guide groove 36 in the advanced angle direction Sa also corresponds to the first stop state.

Afterwards, in a case where the relative rotation direction is reversed in the advanced angle direction Sa, the second lock member 32 surely hits a wall surface of the second recess portion 35 in the retarded angle direction Sb even when the shifting speed of the relative rotation phase is high. As a result, as illustrated in FIG. 2, the first lock member 31 and the second lock member 32 are fitted to the first recess portion 33 and the second recess portion 35 respectively so that the relative rotation phase is locked at the intermediate lock phase P1, which results in the second stop state.

Figure 8:
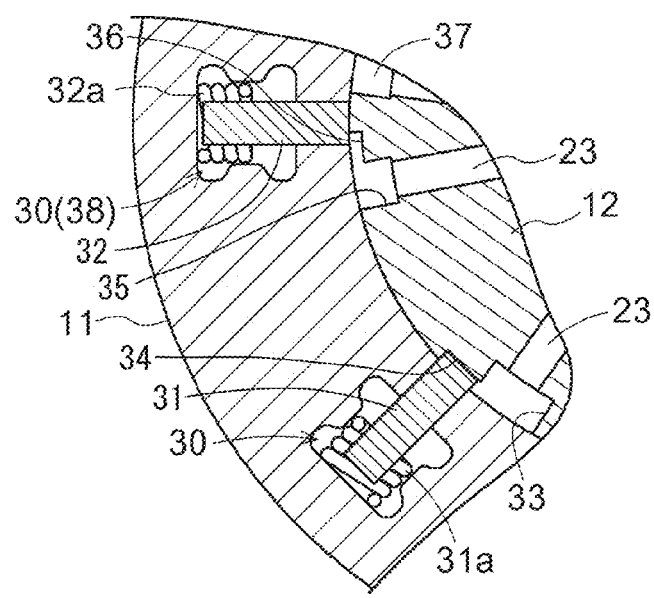
FIG. 8 is a cross-sectional view illustrating the first stop state in a third operation of the variable valve timing control apparatus according to the embodiment.

In the third operation, in a case where the relative rotation phase is shifted in the retarded angle direction Sb from the most advanced angle phase, the first lock member 31 and the second lock member 32 fail to be fitted to the first recess portion 33 and the second recess portion 35 respectively and the relative rotation phase goes beyond the intermediate lock phase P1. At this time, as illustrated in FIG. 8, the first lock member 31 fails to be fitted to the first recess portion 33 and is engaged at the first guide groove 34. The first lock member 31 hits a wall surface of the first guide groove 34 in the advanced angle direction Sa and the relative rotation phase is inhibited from further changing in the retarded angle direction Sb. The second lock member 32 fails to be fitted not only to the second recess portion 35 but also to the second guide groove 36 and moves beyond the second recess portion 35 and the second guide groove 36. The state where the first lock member 31 hits the wall surface of the first guide groove 34 in the advanced angle direction Sa also corresponds to the first stop state.

Afterwards, in a case where the relative rotation direction is reversed in the advanced angle direction Sa, the second lock member 32 surely hits the wall surface of the second recess portion 35 in the retarded angle direction Sb even when the shifting speed of the relative rotation phase is high. As a result, as illustrated in FIG. 2, the first lock member 31 and the second lock member 32 are fitted to the first recess portion 33 and the second recess portion 35 respectively so that the relative rotation phase is locked at the intermediate lock phase P1, which results in the second stop state.

Figure 9:
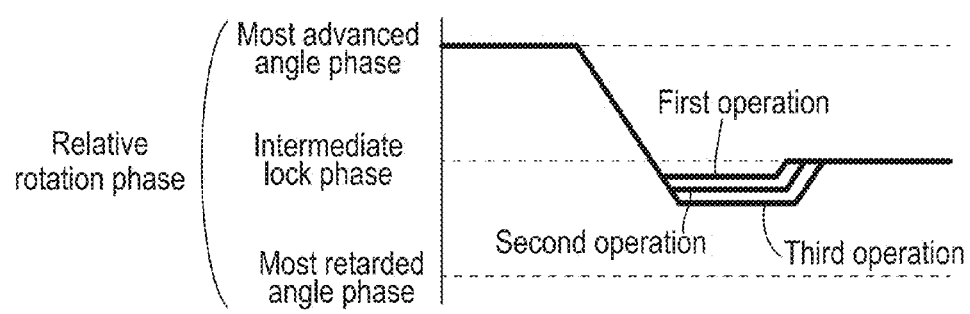
FIG. 9 is a time chart illustrating the change of the relative rotation phase in a state where the relative rotation phase is brought to the locked state at the intermediate lock phase from the most advanced angle phase in first, second, and third operations.

FIG. 9 is a time chart indicating the change of the relative rotation phase until the relative rotation phase is locked at the intermediate lock phase P1 from the most advanced angle phase in the first, second, and third operations. As illustrated in FIG. 9, in the first, second, and third operations, the respective relative rotation phases when the first stop state is obtained and respective time periods for obtaining the first stop state are different from one another. Nevertheless, the locked state at the intermediate lock phase P1 is eventually established in any of the first, second, and third operations. That is, in a case where the change direction of the relative rotation phase is reversed in the first to third operations after the relative rotation phases passes over the intermediate lock phase P1 in the first stop state, the first lock member 31 and the second lock member 32 each of which groove depth is greater than the groove depth of each of the first and second grooves 34 and 36 are formed in a direction towards the intermediate lock phase P1. Consequently, the intermediate lock phase P1 is achieved in the second stop state. In any of the first to third operations, the relative rotation phase securely reaches the intermediate lock phase P1 in the second stop state.

In the aforementioned embodiment, the case where the detection error occurs has been explained. At this time, a case where a difference between the absolute value of the actual relative rotation phase and the detection value of the relative rotation phase detected by the phase control portion 42 is within the specified angle range is also applicable in the embodiment.

In a case where the first lock member 31 and the second lock member 32 are fitted to the first recess portion 33 and the second recess portion 35 respectively in the first stop state, the relative rotation phase is already at the intermediate lock phase P1. Thus, even when the change direction of the relative rotation phase is reversed to obtain the second stop state, the relative rotation phase is not changed from the intermediate lock phase P1. That is, in the case where the first lock member 31 and the second lock member 32 are fitted to the first recess portion 33 and the second recess portion 35 respectively in the first stop state, the locked state at the intermediate lock phase P1 is also established in the second stop state.

In the present embodiment, the first lock member 31 and the first recess portion 33 are formed in the retarded angle direction Sb relative to the second lock member 32 and the second recess portion 35. Alternatively, the first lock member 31 and the first recess portion 33 may be formed in the advanced angle direction Sa relative to the second lock member 32 and the second recess portion 35.

In the present embodiment, the first lock member 31 and the second lock member 32 are configured to move in the radial direction. Alternatively, the intermediate lock mechanism 30 and the most retarded angle lock mechanism 38 may be configured so that the first lock member 31 and the second lock member 32 move along the axis X.

The embodiment is applicable to a variable valve timing control apparatus that controls a relative rotation phase of a driven-side rotation member relative to a driving-side rotation member that rotates in synchronization with a crankshaft of an internal combustion engine.

In order to reach the locked state at the intermediate lock phase P1 for a short time period, the absolute value of the relative rotation phase is necessarily accurately detected. In doing so, the crank angle sensor 1a and the cam angle sensor 3a, for example, for detecting the relative rotation phase should include a high accuracy and not operate wrongly. According to the present embodiment including the aforementioned configuration, the first stop of the relative rotation phase is detected and the change direction of the relative rotation phase after the first stop is reversed so that the relative rotation phase reaches the intermediate lock phase P1. Thus, even in a case where the absolute value of the relative rotation phase is inhibited from being accurately detected due to the wrong detection of the sensors 1a and/or 3a or the other reasons, for example, the relative rotation phase may securely reach the intermediate lock phase P1 for a short time period.

In the embodiment, in the locked state, the relative rotation phase is locked at the intermediate lock phase P1 by the second lock member 32 being fitted to the second recess portion 35.

In order to lock the relative rotation phase at the intermediate lock phase P1 by one of the first and second lock members 31 and 32 and one of the first and second recess portions 33 and 35, and to restrain an occurrence of hitting sound, a fitting gap formed between one of the first and second lock members 31 and 32 and one of the first and second recess portions 33 and 35 upon fitting thereof is desired to be small. According to the configuration of the present embodiment, the number of components on which a dimension accuracy control is required is relatively small to thereby easily reduce the size of the fitting gap in the locked state. Nevertheless, in order to achieve the locked state with the small fitting gap in a case where the relative rotation phase is shifted to the intermediate lock phase P1 from the state where the first lock member 31 and the second lock member 32 are arranged relative to the first recess portion 33 and the second recess portion 35 at the side opposite from the side where the first and second guide grooves 34 and 36 are formed, the change speed of the relative rotation phase is necessarily slow so as to accurately match the positions of the first and second lock members 31 and 32 and the first and second recess portions 33 and 35, which requires time for obtaining the locked state. According to the configuration of the embodiment, however, the change speed is not required to be reduced, thereby achieving the intermediate lock phase P1 for a short time period.

In addition, in the embodiment, the second guide groove 36 is formed at the second recess portion 35.

Accordingly, even with the small fitting gap between the second lock member 32 and the second recess portion 35, the second lock member 32 and the second recess portion 35 may be securely fitted to each other.

Further, in the embodiment, the sensor is formed by a combination of the crank angle sensor 1a and the cam angle sensor 3a.

Accordingly, the absolute value of the relative rotation phase is detected, by calculation, by the phase control portion 42. It is securely detectable that the change of the relative rotation phase is stopped to thereby securely obtain the intermediate lock phase P1.

Furthermore, in the embodiment, the sensor is the hydraulic sensor 70.

In a vehicle equipped with the hydraulic sensor 70, it is detectable that the change of the relative rotation phase is stopped without the usage of the crank angle sensor 1a or the cam angle sensor 3a. Thus, the relative rotation phase may securely reach the intermediate lock phase P1 with a simple configuration.

Furthermore, in the embodiment, the phase control portion 42 determines that the locked state is established in a case where the relative rotation phase is brought to the second stop state.

Accordingly, even in a case where the absolute value of the relative rotation phase is not accurately detected because of a wrong operation of the sensors 1a and/or 3a or the other reasons, for example, it is securely detectable that the change of the relative rotation phase is stopped.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A variable valve timing control apparatus comprising:
    a driving-side rotation member rotating in synchronization with a crankshaft of an internal combustion engine;
    a driven-side rotation member arrange to be coaxial with the driving-side ration member and rotating in synchronization with a camshaft for opening and closing a valve of the internal combustion engine;
    an intermediate lock mechanism including first and second lock members provided at one of the driving-side rotation member and the driven-side rotation member to be movable, first and second recess portions provided at the other of the driving-side rotation member and the driven-side rotation member, and a guide groove continuously formed from a portion of at least one of the first and second recess portions, the intermediate lock mechanism being selectively switchable between a locked state in which a relative rotation phase of the driven-side rotation member relative to the driving-side rotation member is locked at an intermediate lock phase between a most advanced angle phase and a most retarded angle phase because of the first and the second lock members moving to be fitted to the first and second recess portions respectively and an unlocked state in which the locked state is released because of the first and the second lock members separating from the first and second recess portions respectively, a restriction of the relative rotation phase which prevents the relative rotation phase from changing in both an advanced angle direction and a retarded angle direction at the intermediate lock phase being achieved by a fitting between a single one of the first and the second lock members and a single one of the first and second recess portions;
    a sensor detecting whether or not the relative rotation phase is changed;
    a control portion controlling a relative rotation of the driven-side rotation member relative to the driving-side rotation member;
    the control portion performing a control for changing the relative rotation phase based on a request for changing the relative rotation phase from the unlocked state to the locked state so that the relative rotation phase is changed until a first stop state is established, the first stop state in which the change of the relative rotation phase is stopped, in a state where the relative rotation phase is in the unlocked state and one of the first and second lock members configured to be fitted to one of the first and second recess portions at which the guide groove is formed is positioned relative to the one of the first and second recess portions at which the guide groove is formed at a side opposite from a side where the guide groove is formed; and
    the control portion performing a control for changing the relative rotation phase by reversing a change direction of the relative rotation phase after the first stop state is established so that the relative rotation phase is changed until a second stop state is established, the second stop state in which the change of the relative rotation phase is stopped.

2. The variable valve timing control apparatus according to claim 1, wherein the guide groove is formed at the second recess portion.

3. The variable valve timing control apparatus according to claim 1, wherein the sensor is formed by a combination of a crank angle sensor and a cam angle sensor.

4. The variable valve timing control apparatus according to claim 1, wherein the sensor is a hydraulic sensor.

5. The variable valve timing control apparatus according to claim 1, wherein the control portion determines that the locked state is established in a case where the relative rotation phase is brought to the second stop state.

* * * * *